United States Patent
Wagner et al.

[11] Patent Number: 5,773,935
[45] Date of Patent: Jun. 30, 1998

[54] SWITCHING DEVICE FOR THE LIGHTING SYSTEM OF MOTOR VEHICLES HAVING A MAIN SWITCH COUPLED TO A DECISION LOGIC DEVICE

[75] Inventors: Armin Wagner, Karlsfeld; Frank Bilz, Munich, both of Germany

[73] Assignee: Bayerische Motoren Werke AG, Munich, Germany

[21] Appl. No.: 882,354

[22] Filed: Jun. 25, 1997

Related U.S. Application Data

[63] Continuation of Ser. No. 520,339, Aug. 28, 1995, abandoned.

[30] Foreign Application Priority Data

Aug. 26, 1994 [DE] Germany .......................... 44 30 279.7

[51] Int. Cl.$^6$ .................................................. H05B 37/00
[52] U.S. Cl. .............................. 315/77; 315/82; 307/10.8
[58] Field of Search ................................. 315/82, 77, 80, 315/83; 307/10.1, 10.8

[56] References Cited

U.S. PATENT DOCUMENTS

| 4,435,648 | 3/1984 | Goode ..................................... 307/10.1 |
| 5,247,440 | 9/1993 | Capurka et al. .................... 364/424.05 |
| 5,382,877 | 1/1995 | Katsumata et al. ....................... 315/82 |
| 5,473,306 | 12/1995 | Adell ...................................... 340/468 |

FOREIGN PATENT DOCUMENTS 0 505 334  9/1992  European Pat. Off. .

*Primary Examiner*—Robert Pascal
*Assistant Examiner*—David Vu
*Attorney, Agent, or Firm*—Evenson, McKeown, Edwards & Lenahan, P.L.L.C.

[57] ABSTRACT

A switching device for the lighting system of motor vehicles includes a rotary switch which can be adjusted in different rotating positions, and devices for wiring the connected electric light devices corresponding to the settings of the rotary switch. The rotary switch furnishes control signals in its rotating position which can be differentiated from one another. The control signals are guided to a decision logic. The lighting devices can be switched by load switches which can be controlled by the decision logic.

9 Claims, 2 Drawing Sheets

5,773,935

SWITCHING DEVICE FOR THE LIGHTING SYSTEM OF MOTOR VEHICLES HAVING A MAIN SWITCH COUPLED TO A DECISION LOGIC DEVICE

This application is a continuation of application Ser. No. 08/520,339, filed on Aug. 28, 1995, now abandoned.

BACKGROUND AND SUMMARY OF THE INVENTION

The present invention relates to a switching device for the lighting system of motor vehicles and, more particularly, to a switching device including a main switch which can be adjusted in different defined positions, and including devices for operably configuring the connected electric lighting devices to correspond to the settings of the main switch.

A known switching device is described in German Patent document DE 38 34 390 C1. In the German Patent document, the switching device, as a main switch, includes a pressure switch having a control element which interacts with a control connecting link. The control connecting link has contoured runs which extend transversely to the operating directions of the control element. When the control element is adjusted in one operating direction, the contoured runs cause a forced adjustment in the other operating direction. Thus, radial and axial adjustments are implemented simultaneously and the rotary switch is guided in a restricted manner into the permissible switching positions. This switching device results in high constructive expenditures and is large and heavy.

There is therefore needed a switching device of the above-mentioned type which is characterized by a simple construction, a low weight and a small volume.

The present invention meets these needs by providing a switching device for the lighting system of motor vehicles including a main switch which can be adjusted in different defined positions, and including devices for operably configuring the connected electric lighting devices to correspond to the settings of the main switch. In its rotating position, the main switch furnishes control signals which can be differentiated from one another. The control signals are guided to a decision logic device. The lighting devices can be switched by load switches which can be controlled by the decision logic device.

By means of the main switch, load currents are no longer switched, but rather only significantly smaller control currents are switched for the control signals. These control signals are converted into switching commands for the load switches via the decision logic and the lighting system is switched by the load switches.

The superiority of the switching device according to the present invention is demonstrated if the decision logic is programmable. In the case of a breakdown of a lighting device, it will, for example, be possible to assign its function to another lighting device if the function of that lighting device is not needed or has subordinate significance. This basic idea is shown, for example, in German Patent document DE 41 20 893.

It may also be an advantage for the decision logic to be programmable in accordance with the different national laws for the wiring of lighting systems. By means of a switching device which, at first, is not programmed, it is possible to construct this switching device corresponding to the respective national circumstances. Thus, it is possible, for example, to use the lateral turn signals required in the U.S. as parking lights. This takes place with one light bulb in the pertaining light fixtures. The setting-up of mechanical control connecting links for the different respective countries is hence unnecessary.

The programming itself may take place, for example, during the manufacturing of the motor vehicle (belt end programming) and/or during the operation of the motor vehicle. When crossing the border of a country, it is possible, for example, to input the particular country through a vehicle computer and to change the programming of the decision logic as a function thereof.

It is also possible to record the crossing of a national border via an on-board navigation system or through a radio signal emitted at the border. The crossing signal is converted into a corresponding change of the programming of the decision logic. The switching device will then offer the advantage of being equipped with the respective required lighting devices or lighting device wiring for the respective country. The operation of the switching device does not change for the vehicle user.

It is a further advantage of the present invention that the electric construction of the switching device is simplified. Since the load switches take over the function of the electric fuses, separate electric fuses are not required. In the event of a defect occurring, the load switches are controlled by the decision logic device to operate in the manner of an electric fuse.

By means of the interaction of the decision logic and the load switches in the case of any restarting of the motor vehicle, the normal function of the lighting system can be reestablished, if until then a possible existing fault has been eliminated. Otherwise, the protection in the fuse-like manner again takes place using the load switch.

It is a further advantage of the present invention that the possible applications of the switching device are increased. In addition to the rotary switch, push buttons are provided by which control signals may also be input into the decision logic. Through the use of these push buttons, it is possible to implement, for example, the operation of the fog light or of a headlight range control. However, these lighting functions, additionally adjusted by the push buttons, should be carried out only if this is permissible; that is, if it is allowed by the programming of the control logic.

Finally, the present invention has the advantage of minimizing the overall space required for the essential elements of the switching device. Because of the integration of the individual elements in a common housing, wiring lines can be saved and auxiliary functions, such as the lighting of the rotary switching, the push buttons and possibly of symbols assigned to the adjustments of these switches can be implemented in the surface of the housing at low expenditures.

Other objects, advantages and novel features of the present invention will become apparent from the following detailed description of the invention when considered in conjunction with the accompanying drawings.

DETAILED DESCRIPTION OF THE DRAWINGS

Figure 1:
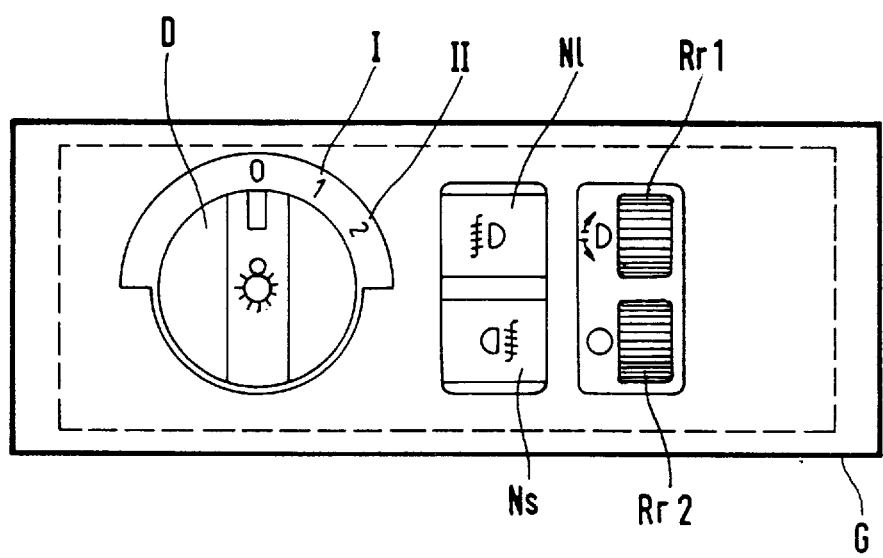
FIG. 1 is a front view of a switching device according to the present invention.

In a housing G, the switching device illustrated in FIG. 1 contains a rotary switch D for basic lighting functions, two push buttons NL and NS for the forward fog light and the rearward fog light, as well as two knurled wheels Rr1 and Rr2 for adjusting the light range or the brightness of the dashboard lighting.

From its initial position marked with 0, the rotary switch D can be adjusted into two positions I and II. After their operation, the push buttons NL and NS return to their initial position. The knurled wheels Rr1 and Rr2 can be adjusted between two stops.

Figure 2:
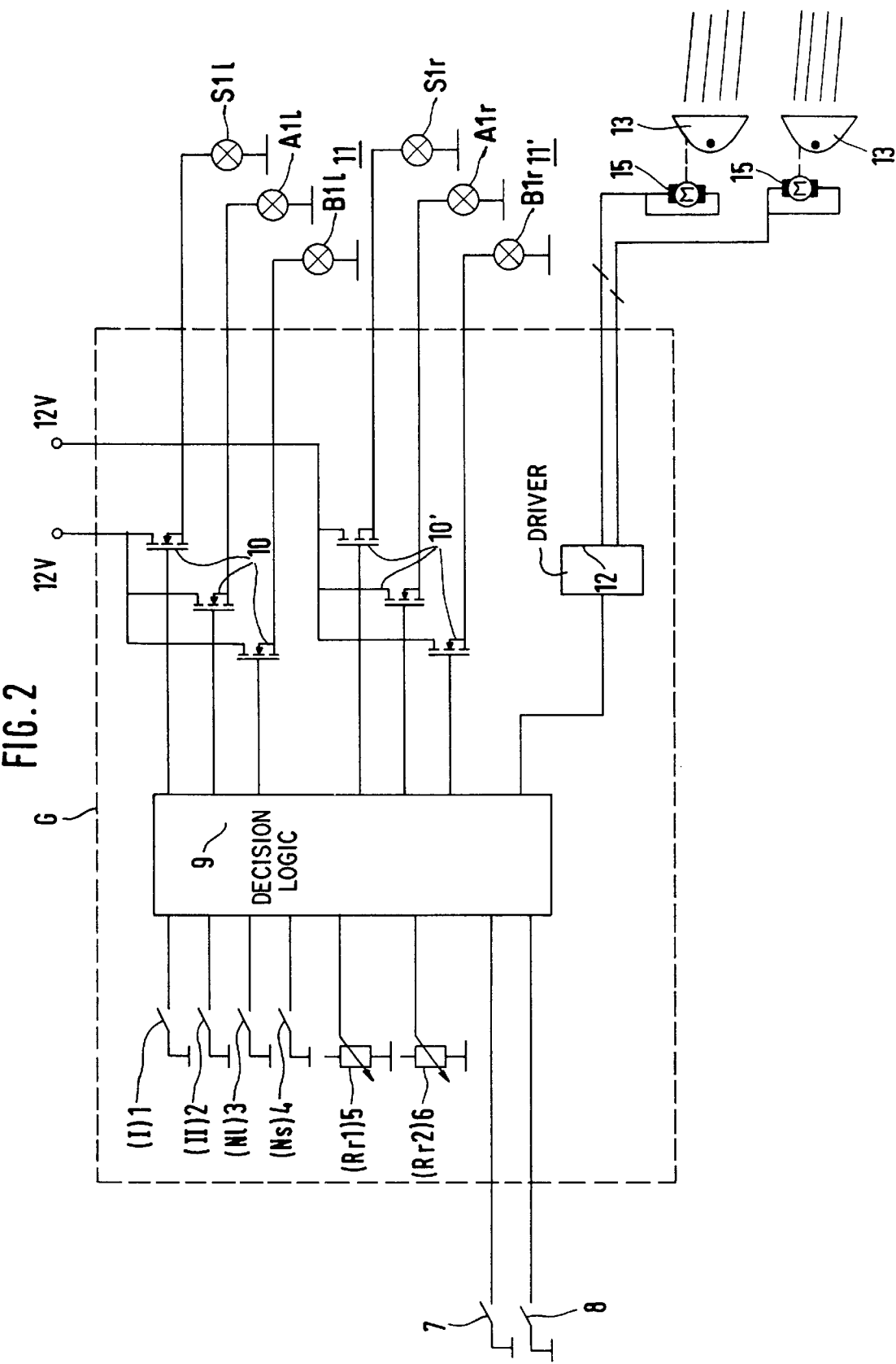
FIG. 2 is a schematic diagram of the implementation of the switching device of FIG. 1 with respect to the wiring.

Through the use of the rotary switch D, the push buttons NL and NS and the knurled wheels Rr1 and Rr2, control currents are switched or controlled, as illustrated in FIG. 2. In the switching positions I and II, as well as by means of the push buttons NL and NS, control switches 1 to 4 are operated. By means of the knurled wheels Rr1 and Rr2, potentiometers 5 and 6 are adjusted. A decision logic 9 is connected behind elements 1 to 6. The decision logic 9 controls the different lighting functions of the motor vehicle. For this purpose, additional external control switches 7 and 8 exist for the emergency flasher function and the high-beam function, and additional control switches (not shown) exist for the turn signal function.

The decision logic 9 can be implemented using a standard processor. In a preferred embodiment of the invention, a Motorola HC 11 microprocessor is used. The decision logic 9 can be programmed. The programming relates to the basic lighting function, such as the parking light and the low beam, as well as to the wiring of the lighting fixtures in the case of a defect, or in accordance with national laws. The programming is performed based on the following table for operation in the United States. In the table, the decision logic 9 is termed a "light module". A set of definitions are also provided for the abbreviations used throughout the table. It is readily understood that it is well within the skill of a routineer in the art to properly program the microprocessor decision logic in order to accomplish the functions set forth in the table. Of course, in keeping with the spirit and scope of the present invention, different programming tables can also be provided for various other locations, including Canada, Scandinavia, Denmark, Norway, as well as the European community.

TABLE 1

| CODING FOR USA | | | |
|---|---|---|---|
| Light Functions | KL-30 | KL-R | KL-15 |
| Warning flashers | WBL | WBL | WBL |
| Direction flashers | — | BLK-L | BLK-L |
|  |  | BLK-R | BLK-R |
| Standing light | — | — | — |
| Parking light/rear light | SL | SL | SL |
|  | AL | AL | AL |
| Rear light inside | SL | SL | SL |
|  | AL | AL | AL |
| License plate illumination | SL | SL | SL |
|  | AL | AL | AL |
| Dimmer light (1) | — | — | AL |
| High beam (2) | — | LH | LH |
|  |  |  | FL + AL |
|  |  |  | FL + SL + NSW |
| Fog light (3) | — | — | NSW + AL |
|  |  |  | NSW + SL |
| Fog rear light | — | — | NSL + AL |
|  |  |  | NSL + SL + NSW |
| Stop light | — | BLS | BLS |
| Backup light | — | — | RG |

TABLE 1-continued

| Headlight range adjustment | SL | SL | SL |
|---|---|---|---|
|  | AL | AL | AL |
|  |  | Mot. | Mot. |
| Light switch - illumination | SL: dimmed | 0: EIN | 0: EIN |
|  | AL: dimmed | SL: dimmed | SL: dimmed |
|  |  | AL: dimmed | AL: dimmed |
| Searchlight KL58G (dimmed) | SL | SL | SL |
|  | AL | AL | AL |

(1) not in the case of DWA-warning flashers with AL
(2) not in the case of DWA-warning flashers with FL
(3) not when AL with FL is switched on, but in the case of AL with LH

TABLE OF DEFINITIONS FOR ABBREVIATIONS USED IN CODING TABLE FOR U.S.

| Abbreviation | Definition |
|---|---|
| WBL | Warning flashers activated by key buttons |
| BLK-L | Driving direction dimmer switch in flashing-left position |
| BLK-R | Driving direction dimmer switch in flashing-right position |
| 0 | Light switch in light-off position |
| SL | Light switch in parking light position |
| AL | Light switch in dimming light position |
| FL | Driving direction dimmer switch in high-beam position |
| LH | Driving direction dimmer switch in headlight flasher position |
| NSW | Fog lamp switch in fog light position or fog light with rear fog light position |
| NSL | Fog lamp switch in rear fog light position or fog light with rear fog light position |
| BLS | Stop light switch active, pedal pressed down |
| RG | Reverse gear engaged (per telegram) |
| Mot. | Engine running (per telegram) |
| DWA | Anti-theft warning system |

The decision logic 9 switches a number of lighting fixtures 11 and 11' by controlling power switches 10 and 10' connected between the lighting fixtures 11, 11' and the decision logic 9. The load switches 10 and 10' are combined into two groups which are individually connected to the vehicle.

The lighting devices are bulbs S1l and S1r for the parking light on the left and right vehicle side; A1l and A1r for the low beam on the left and on the right; and B1l and B1r for the turn signal light on the left and on the right of the vehicle. Additional bulbs for the high beam, for the lateral clearance lights, and for the fog light in the front and in the rear, etc. are not shown.

In the case of a proper operation, in position I of the rotary switch D, the parking light S1l, S1r is switched on by controlling the pertaining load switches 10 by the decision logic 9. Correspondingly, in position II, the low beam A1l and A1r is switched on. A corresponding operation is achieved by operating a turn signal switch (not shown) for the left or the right turn signal light B1l, B1r. The control switch 8 is operated for the high beam. The control switch 7 is operated for the triggering of the emergency flasher function by the simultaneous switching-on of the left and the right turn signal lights B1l and B1r. In addition, motor operators 15 are illustrated in FIG. 2. The motor 15 are controlled by a driver 12. By means of the motors 15, the range of movement of the schematically illustrated headlights 13 is adjusted. For reasons of clarity, the lighting fixtures contained in these headlights, such as S1l and A1l or S1r and A1r are illustrated separately.

The decision logic 9 can be programmed. It therefore becomes possible to comply with the respective country-specific requirements with respect to the lighting system of the motor vehicle and to carry out emergency measures in the case of a defect. The switched-on and/or defective lights or lighting functions may be indicated by the decision logic 9 separately in a display (not shown). If, for example, the high beam fails on one side, the parking light bulb S1r or S1l of the same side can at least partially take over this function. For this purpose, the pertaining load switch is controlled in the sense of an increase of the output.

If the parking bulb S1l or S1r fails, in position I of the rotary switch, the low beam bulb A1l or A1r for the same side can be operated at reduced power. The pertaining load switch 10, 10' is controlled in the sense of a power reduction. When the emergency flasher function is triggered, the turn signal lights B1l and B1r can be controlled at a timing frequency which is equal to twice the timing frequency in the turn signal operation.

When the motor vehicle is operated in a country in which, during the drive, some exterior lighting must always be switched on, such as the low beam, this operation can be triggered by the decision logic even without operating the rotary switch. This decision logic will then be programmed such that, when the ignition circuit is closed (not shown) or during a drive, it switches on the low beam bulbs A1l and A1r by means of the pertaining load switches 10 and 10'. The transition in the operating mode of the lighting system may be carried out by the corresponding programming of the control logic 9 in connection with the recognition of a border crossing. The recognition takes place automatically, for example, using a navigation system (not shown) and is not noticed by the vehicle user.

It therefore becomes possible to meet the various demands on the lighting system of a motor vehicle by using one switching device.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Switching device for a lighting system of a motor vehicle, comprising:

a single main rotary switch being adjustable into one of several different predefined settings indicative of different basic lighting states of the vehicle;

a plurality of electric lighting devices for different lighting functions in the motor vehicle electrically wired together to correspond with the different lighting states of the vehicle according to the predefined settings of the main switch;

wherein said single main rotary switch activates control signals which are different from one another for each of the predefined settings of the main switch;

a decision logic device receiving said control signals;

load switches coupled between the decision logic device and said plurality of electric lighting devices, said plurality of electric lighting devices being switched by said load switches which are controlled by said decision logic device programmed to operate said different lighting states of the vehicle.

2. A switching device according to claim 1, wherein said decision logic device is programmable.

3. A switching device according to claim 2, wherein said decision logic device is programmed to control said load switches to operate said electric lighting devices in accordance with different national laws for said electric lighting devices.

4. A switching device according to claim 1, wherein in the event of a defect occurring, said load switches are controlled by said decision logic device to operate in the manner of an electric fuse to interrupt a current flow.

5. A switching device according to claim 4, wherein said decision logic device controls said load switches, during a restarting operation of the vehicle, for a short-time switching-on of said electric lighting devices.

6. A switching device according to claim 1, further comprising additional switches for providing control signals to said decision logic device for operating additional lighting devices.

7. A switching device according to claim 6, further comprising a common housing in which said main switch, said decision logic device, and said load switches are arranged.

8. A switch device according to claim 7, wherein said additional switches are arranged in said common housing.

9. A switching device according to claim 1, further comprising a common housing in which said main switch, said decision logic device, and said load switches are arranged.

* * * * *